(12) United States Patent
Laserson et al.

(10) Patent No.: US 11,551,227 B2
(45) Date of Patent: Jan. 10, 2023

(54) DATA-DRIVEN MACHINE-LEARNING THEFT DETECTION

(71) Applicant: NCR Corporation, Atlanta, GA (US)

(72) Inventors: Itamar David Laserson, Givat Shmuel (IL); Avishay Farbstein, Bruchin (IL); Tali Shpigel, Bnei brak (IL); Mor Zimerman Nusem, Even (IL)

(73) Assignee: NCR Corporation, Atlanta, GA (US)

( * ) Notice: Subject to any disclaimer, the term of this patent is extended or adjusted under 35 U.S.C. 154(b) by 555 days.

(21) Appl. No.: 16/555,775

(22) Filed: Aug. 29, 2019

(65) Prior Publication Data
US 2021/0065189 A1    Mar. 4, 2021

(51) Int. Cl.
*G06Q 20/40* (2012.01)
*G06Q 20/20* (2012.01)
*G06N 20/00* (2019.01)

(52) U.S. Cl.
CPC ......... *G06Q 20/4016* (2013.01); *G06N 20/00* (2019.01); *G06Q 20/206* (2013.01); *G06Q 20/208* (2013.01)

(58) Field of Classification Search
CPC ............. G06Q 20/4016; G06Q 20/206; G06Q 20/208; G06N 20/00
USPC .......................................................... 705/75
See application file for complete search history.

(56) References Cited

U.S. PATENT DOCUMENTS

| | | | | |
|---|---|---|---|---|
| 2003/0083964 | A1* | 5/2003 | Horwitz | G06Q 10/087 705/28 |
| 2005/0189414 | A1* | 9/2005 | Fano | G06Q 30/0255 235/383 |
| 2006/0243798 | A1* | 11/2006 | Kundu | G06Q 20/4016 235/383 |
| 2009/0226099 | A1* | 9/2009 | Kundu | G06Q 20/4016 382/224 |
| 2010/0217678 | A1* | 8/2010 | Goncalves | G06Q 20/203 705/22 |
| 2011/0131105 | A1* | 6/2011 | Aonuma | G06Q 20/20 705/16 |
| 2012/0169879 | A1* | 7/2012 | Libal | G06Q 10/063 348/150 |
| 2015/0221191 | A1* | 8/2015 | Doyle | G08B 13/00 340/568.1 |
| 2016/0267329 | A1* | 9/2016 | Fan | G07G 1/009 |
| 2019/0130407 | A1* | 5/2019 | Adjaoute | G06Q 20/384 |
| 2022/0188827 | A1* | 6/2022 | Cifarelli | G06Q 20/4016 |

OTHER PUBLICATIONS

Sweethearting is a Theft, Editorial Team (Year: 2013).*
No Sweethearting, Dialog (Year: 1999).*

* cited by examiner

*Primary Examiner* — A. Hunter Wilder
(74) *Attorney, Agent, or Firm* — Schwegman, Lundberg & Woessner

(57) ABSTRACT

A machine-learning algorithm is trained with features relevant to basket data for items of transactions. The trained algorithm is trained to predict whether a given transaction is more or less likely to be associated with theft being engaged in by a transaction operator for the transaction. The trained algorithm is then provided basket data for a given transaction and produces as output a theft prediction value. When the theft prediction value exceeds a configured threshold value, the transaction is flagged for manual intervention or the transaction is flagged for subsequent manual verification.

5 Claims, 4 Drawing Sheets

DATA-DRIVEN MACHINE-LEARNING THEFT DETECTION

BACKGROUND

Retailers are continuously attempting to improve security in an ongoing effort to reduce in-store theft, which remains a major concern in the industry. In addition to consumer theft, retailers must deal with employee theft. In fact, employee theft is a larger problem in the industry than is consumer theft. This is because employees know the retailer's internal procedures and the location of security resources, such that detection becomes more difficult to detect for knowledgeable employees.

One area where substantial sums of money are lost each year, is cashier theft, which is often referred to as "sweet hearting." Sweet hearing is the unauthorized giving away of merchandise without charge to a customer that is a friend, family member, or fellow employee of the cashier by fake scan or intentional incorrect ring-up of merchandise during the checkout process. Sweet hearting is the most common type of cashier fraud and it is the largest contributor to retail losses in the industry.

Typically, the only way to detect sweet hearting is for the theft to be witnessed in person or for the theft to be captured on a video feed of the cashier's area. Real-time evaluation of video is difficult because of the amount of image processing which must occur. In fact, most video feeds are not evaluated at all due to the vast amount of effort that it takes for evaluation. Furthermore, not all stores are equipped with the proper video equipment and/or many stores lack the requisite computing hardware and software to perform automated image analysis. Some retailers manually review video feeds of past transactions in an effort to detect sweet hearting. Video storage may also be problematic for some smaller retailers.

SUMMARY

In various embodiments, methods and a system for data-driven machine learning theft detection are presented.

According to an embodiment, a method for data-driven machine learning theft detection is presented. Specifically, and in one aspect, item details for items of a transaction are received as input during processing of the transaction at a transaction terminal. A theft prediction value is produced as output based on the item details.

DETAILED DESCRIPTION

Figure 1:
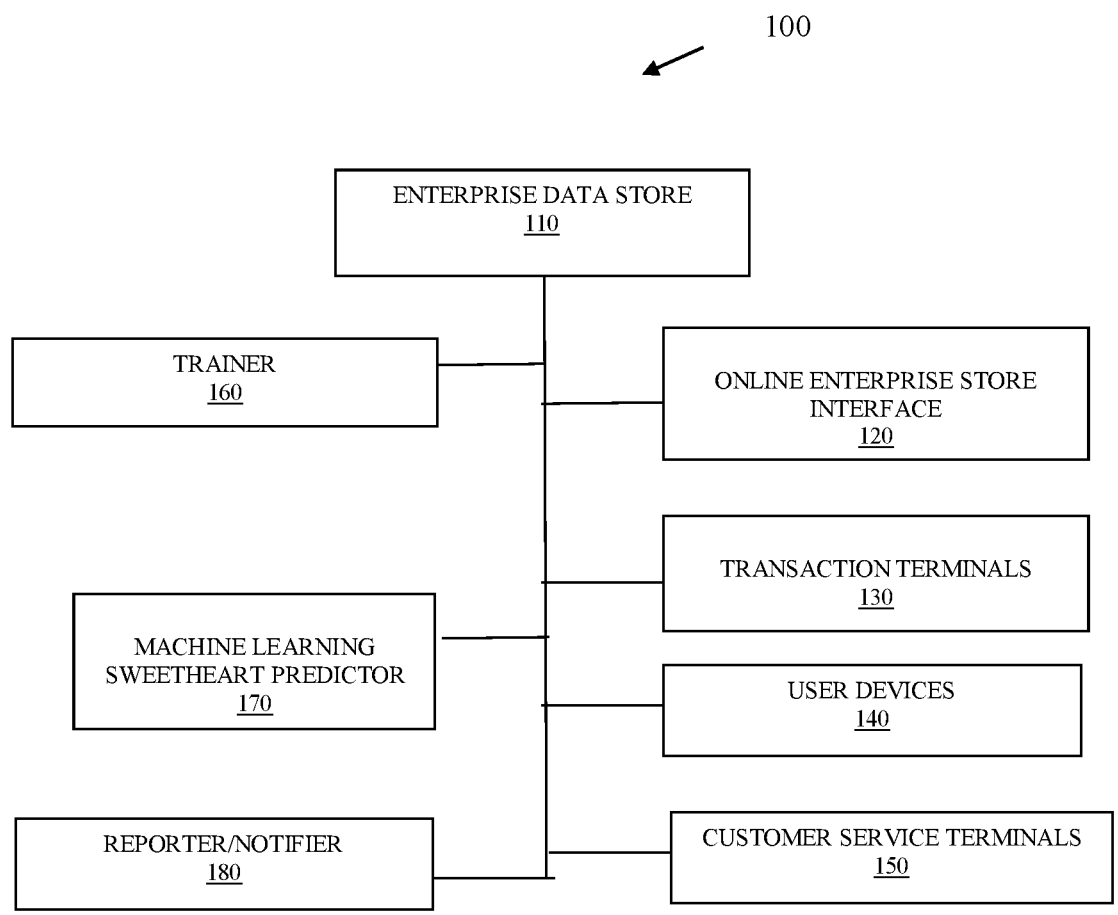
FIG. 1 is a diagram of a system for data-driven machine learning theft detection, according to an example embodiment.

FIG. 1 is a diagram of a system 100 for data-driven machine learning theft detection, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of data-driven machine learning theft detection presented herein and below.

The system 100 provides a mechanism by which a machine-learning algorithm can be trained with transaction item information (basket data) for purposes of predicting whether a transaction is likely to have engaged in theft by incorrectly entering item information or failing to properly scan an item of the transaction. That is, the machine-learning algorithm is data-driven based on the actual items scanned for a transaction and predicts when an item was not scanned. This can be done without video analysis of the transaction but can also be used in cooperating with video-based transaction analysis.

The system 100 includes, an enterprise data store 110, an online enterprise store interface 120, a plurality of transaction terminals 130, user devices 140, a plurality of customer service terminals 150, a machine-learning trainer 160, a machine-learning sweetheart predictor (herein after just "predictor") 170, and a reporter/notifier 180.

The trainer 160, the predictor 170, and the reporter/notifier 180 are executable instructions that reside in a non-transitory computer-readable storage medium. The executable instructions are executed by one or more hardware processors of computing devices. This causes the processed to perform the processing discussed herein and below for 160-180.

The online enterprise store interface 120, the transaction terminals 130, user devices 140, and customer service terminals 150 comprise a plurality of hardware devices that execute software as services provided throughout the enterprise over one or more networks (wired, wireless, and/or a combination of wired and wireless).

The enterprise data store 110 captures data gathered throughout the enterprise by the services. One type of data housed in the data store 110 includes transaction data for transactions conducted on the transaction terminals. The transaction data includes sale price, item detail, transaction date, transaction time of day, transaction day of week, store identifiers for stores associated with each transaction, transaction terminal identifiers, and the like. The data store 110 also includes item inventory, item description, item store location, item shelf location within the store, product categories, product catalogue, etc. Further, the data store 110 may also include a variety of other data such as customer item returns, customer visits to service terminals 150, customer visits to online stores of the enterprise, customer visits to brick-and-mortar stores of the enterprise, customer account details, holiday dates, weather in a particular location on a particular date, sporting event on a given date, any catastrophic newsworthy events observed for a given date.

The enterprise data 110 includes historical transaction data for the enterprise that spans one to several years' worth of transaction data.

Initially, the trainer 160 is used to train the predictor 170 against a configurable amount of transaction data (this can range from a few months of historical transaction data for a large retailer or a few years of transaction data for a small retailer). Historical transactions that were known to have had sweet hearting theft are pre-identified in the training transaction data. The items for each of the training transactions include product catalogue classifications. The basket data for each transaction (the items and their product catalogue classifications) are passed as parameters or factors to the predictor 170 along with an indication as to whether a given transaction was known to have been associated with sweet hearting theft or known to not have been associated with theft. Other factors and parameters for each training transaction are also provided by the trainer 160 to the predictor 170. Some of these factors/parameters can include: total number of items in a given transaction, total number of voids for the given transaction, fraction of distinct items present in the given transaction, total transaction dollar value for the given transaction, distinct scan interval, Point-Of-Sale (POS—a type of transaction terminal 130 operated by a cashier) identifier/number, type of POS (transaction terminal 130), average voided item price for the given transaction, total number of items having more than 1 (number of quantity items), transaction time for the given transaction, item price variance, and transaction duration. It is to be noted that other factors/parameters may be used as well.

Through experimentation it was determined that there is a strong correlation between the basket of items and their corresponding product catalogue classifications and sweet heart theft. Thus, the basket data is a reliable factor in predicting sweet hearting by a cashier at a POS terminal.

As used herein the terms "factors," parameters," and "features" may be used interchangeably and synonymously. These terms refer to the input data that is processed by the predictor 170 to make a prediction as to whether a given transaction will or will not have a sweet hearting theft. The input data is as described above as the parameters, the most significant of which is the basket data (items in a given transaction) along with each item's corresponding product catalogue classification for a given retailer.

The predictor 170 is any regression-based algorithm that takes as input the features and the expected output during a training session with the trainer 180. The predictor 170 derives an algorithm that weights each of the features and produces a numeric output on a scale of 0 to 1. 0 is an indication that there is not believed to be any risk of sweet hearting with a given transaction, whereas as 1 is an indication that sweet hearing is more than likely present for the given transaction. Thus, the closer the numeric output of the predictor 170 is to 1 for a given transaction, the more confidence that the predictor 170 has that the transaction is associated with sweet hearing theft.

In an embodiment, 80% of the initial training data (1-3 years' worth of transactions for a retailer) is used by the trainer 160 to train the predictor 170, the remaining 20% of the training data is used to test the accuracy of the predictor 160.

In an embodiment, the product catalogue is clustered to further reduce item classifications. Each item of a given transaction is assigned a produce catalogue classification and a cluster identification. This can be used to further reduce the number of unique product catalogue classifications in the product hierarchy of a give retailer (this also allows for convergence and building of a feasible module).

Once fully trained, the predictor 170 is released for production and integrated into the retailer's transaction processing. As a transaction is progressing the features are extracted and provided as input to the predictor 170. The predictor 170 produces the numeric output, which can be integrated into the workflow of the retailer for a given transaction. The retailer can set a threshold (for example anything over 80% (0.8)) for comparison against the numeric output of the predictor 170. When the threshold is met or exceed, the workflow may take exception processing to require a manager to finish the transaction at the transaction terminal or to audit the transaction.

In an embodiment, the workflow may flag transactions throughout the data based on the threshold for manual review at the end of the day by the retailer. The retailer may then review video feeds of each of the flagged transactions to determine whether or not there was any sweet heart theft. When manual review or even real-time approval of a transaction shows that there was sweet heart activity or that there was not sweet heart activity, the verified result can be flagged for the given transaction and used by the trainer 160 to retrain the predictor 170. In this way, the predictor 170 can be continuously improved for accuracy and continuously retrained.

The precision (of those flagged transactions the percentage that were actually involved in sweet heart theft) produced by the predictor 170 is continuously improved through ongoing training. Experimentation has shown that the precision of the predictor is 3-4 times better than video analytics in detecting sweet heart theft.

In an embodiment, the workflow of a retailer's transaction is modified to include the numeric output prediction produced by the predictor 170 along with existing transaction video analytics. In such situations, the determinations made through video processing (image analysis) during the transaction can be used as additional training features when the trainer 160 trains the predictor 170. This also provides for improved precision of the predictor 170. Although, it is noted that the predictor 170 does not have to be reliant in any way on video analytics or image processing (as was discussed above).

Integration of a given retailer's transaction workflow to include the prediction output numeric of the predictor 170 can be achieved through the reporter/notifier 180. The reporter/notifier 180 compares the numeric prediction for a given transaction against a configured threshold value (as was discussed above) and when the threshold is met or exceeded, a message (or an Application Programming Interface (API) call) is made to either interrupt the workflow for manual transaction approval or to flag the given transaction for later (end-of-day) review. End-of-day review is just as beneficial to a retailer because a cashier that engages in sweet heart theft once is very likely to engage in that theft again, which means even if the theft is not caught while it was occurring, future thefts can be avoided. Still further, if video review can confirm the theft, the retailer may be able to still recover the lost sales through the employee (such as through payroll deduction assuming local laws permit such deductions or through legal or regulatory actions initiated against the employee).

In an embodiment, the predictor 170 may be integrated into customer returns at customer service terminals 150.

In an embodiment, the predictor 170 may be integrated into transactions where employees use mobile user-devices 140 to check out customers (such as by using mobile phones or tablet devices).

In an embodiment, the predictor 170 may be integrated into transactions where employees use a retailer's online interface 120 to check customers out through a browser-based interface.

In an embodiment, the trainer 160, the predictor 170, and the reporter/notifier 180 are provided from a cloud processing environment. In an embodiment, transaction data associated with the enterprise is also maintained in the cloud processing environment.

In an embodiment, modules 160-180 are provided as Software-as-a-Service (SaaS) to a given enterprise on a subscription basis.

In an embodiment, the transaction terminals 130 include: a Point-Of-Sale (POS) terminal, a Self-Service Terminal (SST) where a cashier is assisting a customer, and/or a kiosk where a cashier is assisting a customer.

In an embodiment, the user devices 140 include: a phone, a tablet, a laptop, and/or a wearable processing device.

In an embodiment, the customer service terminals 150 are desktops, tablets, phones, laptops, and/or transaction terminals 130 configured or being used for customer service operations at any given point in time.

These and other embodiments are now discussed with reference to the FIGS. 2-4.

Figure 2:
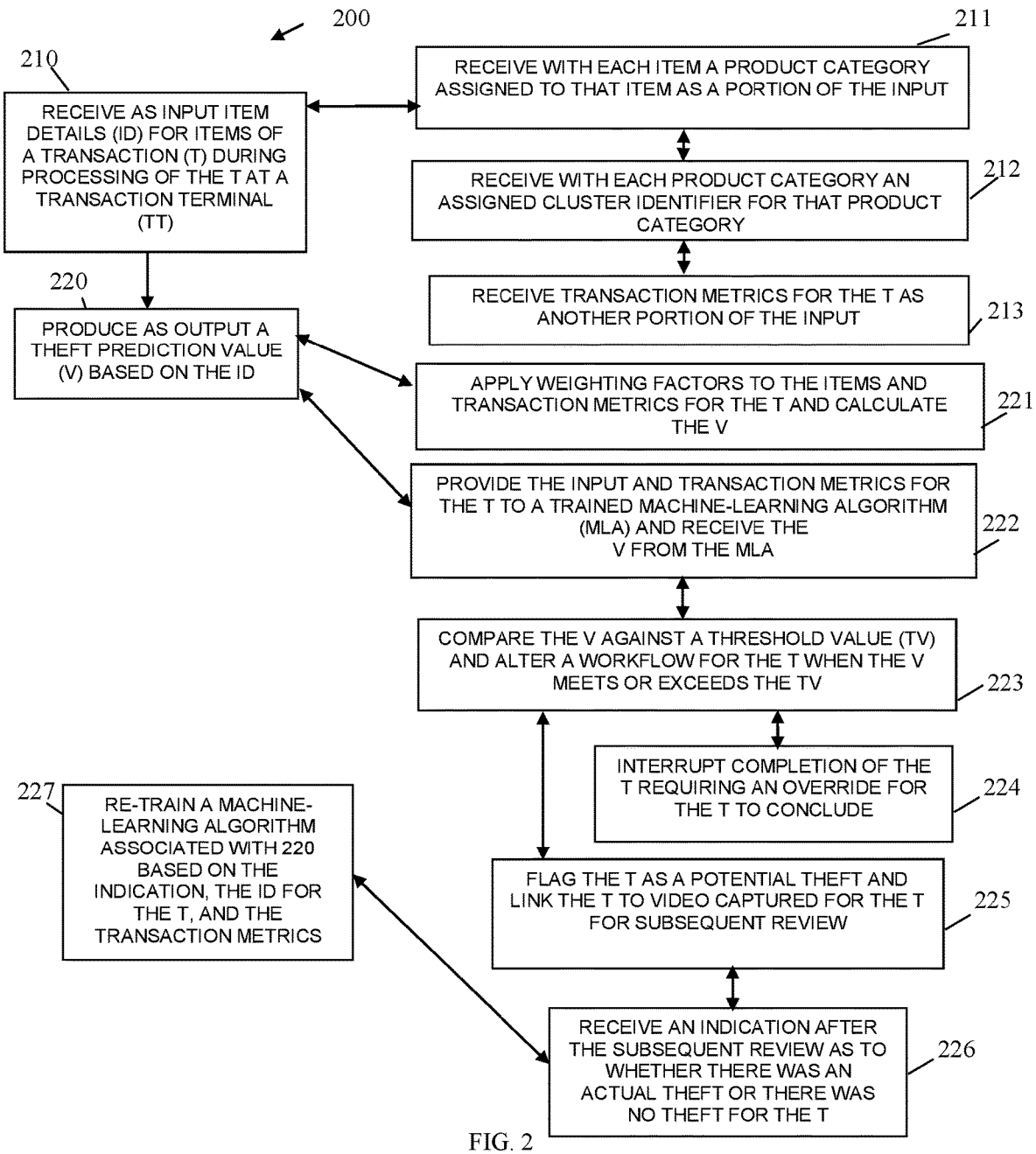
FIG. 2 is a diagram of a method for data-driven machine learning theft detection, according to an example embodiment.

FIG. 2 is a diagram of a method 200 for data-driven machine learning theft detection, according to an example embodiment. The software module(s) that implements the method 200 is referred to as a "predictive-theft manager." The predictive-theft manager is implemented as executable instructions programmed and residing within memory and/or a non-transitory computer-readable (processor-readable) storage medium and executed by one or more processors of a device. The processor(s) of the device that executes the predictive-theft manager are specifically configured and programmed to process the predictive-theft manager. The predictive-theft manager has access to one or more network connections during its processing. The network connections can be wired, wireless, or a combination of wired and wireless.

In an embodiment, the device that executes the predictive-theft manager is a server. In an embodiment, the server is a cloud processing environment that comprises multiple servers cooperating with one another as a single server. In an embodiment, the server is a Local Area Network (LAN) server.

In an embodiment, the device that executes the predictive-theft manager is a network-edge device that is local or on an edge of a LAN of a retail store.

In an embodiment, the predictive-theft manager is all of or some combination of: 160-180.

In an embodiment, the predictive-theft manager is provided as a SaaS to a plurality of enterprises, each enterprise having a subscription relevant to its customers and its provided transaction and customer data.

At 210, the predictive-theft manager receives as input item details for a transaction that is being processed at a transaction terminal. The transaction terminal is being operated by a cashier. In an embodiment, the transaction terminal is any of the transaction terminals 130 discussed above with the FIG. 1.

In an embodiment, at 211, the predictive-theft manager receives a product category that is assigned to each item that is being scanned or entered during the transaction. The product categories are received as a portion of the input.

In an embodiment of 211 and at 212, the predictive-theft manager receives with each product category a cluster identifier that is assigned to that category. In other words, the categories are further assembled in clusters having assigned cluster identifiers.

In an embodiment of 212 and at 213, the predictive-theft manager receives transaction metrics for the transaction as another portion of the input. These transaction metrics were discussed above as the features, parameters, or factors.

At 220, the predictive-theft manager produces as output a theft-prediction value based on the item details (basket of items included in the transaction).

In an embodiment, at 221, the predictive-theft manager applies weighting values to the items and transaction metrics for the transaction, and the predictive-theft manager calculates the theft-prediction value.

In an embodiment, at 222, the predictive-theft manager provides the item details and transaction metrics for the transaction to a trained-machine learning algorithm and receives back from the trained-machine learning algorithm the theft-prediction value. In an embodiment, the trained-machine learning algorithm is the trained-machine learning algorithm 170 of the FIG. 1.

In an embodiment of 222 and at 223, the predictive-theft manager compares the theft-prediction value against a threshold value and when the theft-prediction value meets or exceeds the threshold value, the predictive-theft manager alters a transaction workflow for the transaction.

In an embodiment of 223 and at 224, the predictive-theft manager interrupts completing of the transaction and requires an override in order for the transaction to complete at the transaction terminal. This embodiment allows for a manager to inspect the items of the transaction to ensure that no theft is in progress with the transaction.

In an embodiment of 223 and at 225, the predictive-theft manager flags the transaction as potential theft and links transaction video associated with the transaction for subsequent review and a subsequent determination as to whether the transaction had theft or did not have theft.

In an embodiment of 225 and at 226, the predictive-theft manager receives an indication after the subsequent review as to whether there was actual theft or no theft that took place with the transaction.

In an embodiment of 226 and at 227, the predictive-theft manager retains a machine-learning algorithm associated with the processing at 220 using the item details for the transaction, transaction metrics for the transaction, and the indication. In this way, the precision of the predictive-theft manager is continuously improving.

Figure 3:
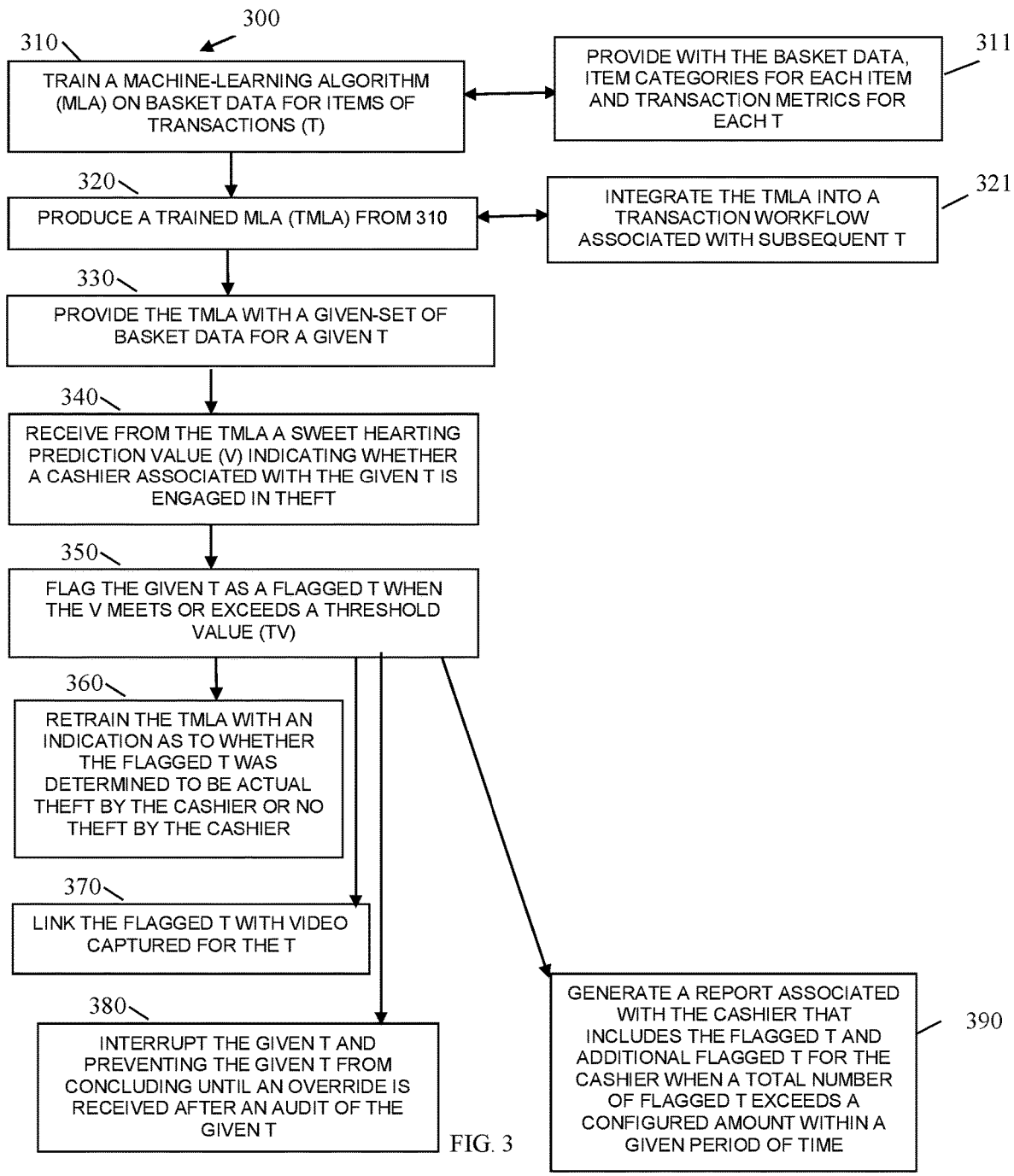
FIG. 3 is a diagram of another method data-driven machine learning theft detection, according to an example embodiment.

FIG. 3 is a diagram of another method 300 for data-driven machine learning theft detection, according to an example embodiment. The software module(s) that implements the method 300 is referred to as a "sweet-hearting predictor." The sweet-hearting predictor is implemented as executable instructions programmed and residing within memory and/or a non-transitory computer-readable (processor-readable) storage medium and executed by one or more processors of a device. The processors that execute the sweet-hearting predictor are specifically configured and programmed to process the sweet-hearting predictor. The sweet-hearting predictor has access to one or more network connections during its processing. The network connections can be wired, wireless, or a combination of wired and wireless.

In an embodiment, the device that executes the sweet-hearting predictor is a server. In an embodiment, the server is a cloud processing environment that comprises multiple servers cooperating with one another as a single server. In an embodiment, the server is a LAN server that is local to a retail store.

In an embodiment, the device that executes the sweet-hearting predictor is a network-edge device that is on the edge of a LAN for a retail store.

In an embodiment, the sweet-hearting predictor is all or some combination of: 160, 170, 180, and/or the method 200.

The sweet-hearting predictor presents another and, in some ways, enhanced processing perspective to that which was described above with the FIG. 2.

At 310, the sweet-hearting predictor trains a machine-learning algorithm on basket data for items of transactions.

In an embodiment, at 311, the sweet-hearting predictor provides item categories, category cluster identifiers, and transaction details for each transaction as input to the machine-learning algorithm along with an expected results for each transaction.

At 320, the sweet-hearting predictor produces a trained-machine learning algorithm.

In an embodiment, at 321, the sweet-hearting predictor integrates the trained-machine learning algorithm into a transaction workflow associated with processing subsequent transactions.

In an embodiment, the processing at 310, 311, 320, and 321 is performed by the trainer 160 of the FIG. 1.

At 330, the sweet-hearting predictor provides the trained-machine learning algorithm with a given set of basket data for a given transaction that is being processed at a transaction terminal.

At 340, the sweet-hearting predictor receives as output from the trained-machine learning algorithm a sweet-hearting prediction value as an indication as to whether a cashier associated with the given transaction is engaged in theft of not during the transaction by not properly scanning items (missing items by not scanning them or entering wrong details for items).

At 350, the sweet-hearting predictor flags the given transaction as a flagged transaction when the sweet-hearting prediction value meets or exceeds a predefined threshold value.

In an embodiment, at 360, the sweet-hearting predictor retrains the trained-machine learning algorithm when an indication is received indicating whether the cashier was confirmed to have committed theft or was confirmed to have not engaged in any theft. That is, once a review is done the results of the review are fed back into the trained-machine learning algorithm to continuously train and improve the precision of the algorithm.

In an embodiment, at 370, the sweet-hearting predictor links the flagged transaction with video captured for the given transaction. This allows the transaction to be manually reviewed or reviewed through image processing to determine if the trained-machine learning algorithm had correctly predicted sweet-hearting by the cashier or not.

In an embodiment, at 380, the sweet-hearting predictor interrupts the given transaction and prevents the given transaction from concluding until an override is received, which confirms that an audit was conducted on the transaction.

In an embodiment, at 390, the sweet-hearting predictor generates a report associated with the cashier that includes the flagged transaction and additional flagged transactions for the cashier when a total number of flagged transactions exceeds a configured amount within a given period of time. That is, different reports can be generated to identify those cashiers considered most likely to be engaged in sweet-hearting activities during checkouts with different configurable criteria.

Figure 4:
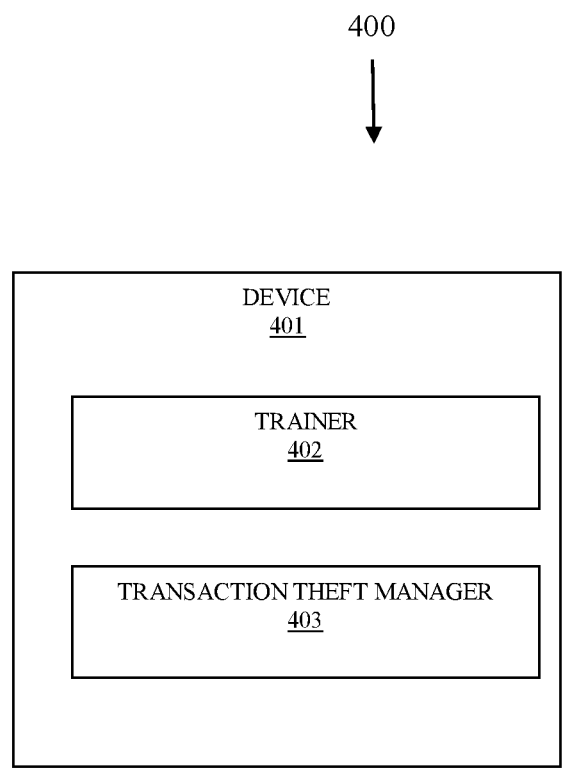
FIG. 4 is a diagram of another system for data-driven machine learning theft detection, according to an example embodiment.

FIG. 4 is a diagram of a system 400 for data-driven machine learning theft detection, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, a trainer 402, and a transaction theft manager 403.

In an embodiment, the processing device 401 is a server. In an embodiment, the server is a collection of servers that cooperate as a cloud processing environment.

In an embodiment, the processing device 401 is a network edge device.

The trainer 402 is a set of executable instructions that is executed on one or more hardware processors of the processing device 401 from a non-transitory computer-readable storage medium or memory.

The transaction theft manager 403 is also a set of executable instructions that is executed on one more hardware processors of the processing device 401 from a non-transitory computer-readable storage medium or memory.

The trainer 402, when executed by the processor(s) of the device 401, is configured to cause the processor to: 1) obtain basket data for historical transactions; 2) assign item categories to items in the basket data for each historical transaction; and 3) train the transaction theft manager 403 with indications assigned to each historical transaction that indicate whether there was theft or there was not theft along with the basket data and the categories for each historical transaction.

The trainer 402 trains the transaction theft manager 403 to detect transaction theft based on the basket data and the item categories.

The transaction theft manager 403 is a machine-learning algorithm that derives an algorithm based on the basket data, the item categories, and transaction details for the historical transactions.

In an embodiment, the trainer 402 is the trainer 160.

The transaction theft manager 403, when executed by the processor(s) of the device 401, is configured to cause the processor to: receive real-time basket data for in-progress transactions along with assigned item categories; and produce theft prediction values for each in-progress transaction.

In an embodiment, the transaction theft manager 403, when executed by the processor(s) of the device 401, is further configured to cause the processor to: interrupt any of the in-progress transactions based on the theft prediction values and/or link video associated with any of the in-progress transactions based on the theft prediction values.

In an embodiment, the device 401 is a cloud-based device that provides a user-facing interface to a user over a network to configure the trainer 402 and the transaction theft manager 403 for the given product catalogue at a given retail store and to supply or identify a transaction data store for obtaining the transaction data for that given retailer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing a processor executable instructions from a non-transitory computer-readable medium causing the processor to perform operations, comprising:
training a machine-learning algorithm on basket data for items of transactions, each basket data includes features that comprise item identifiers for the corresponding items, item classifications for the corresponding items, cluster identifications for the corresponding item classifications, a total number of the corresponding items, a total number of voids for the corresponding transaction, scan interval between recording a previous item and a next item in the corresponding transaction, a terminal type of the transaction terminal associated with the corresponding transaction, a type of transaction for the corresponding transaction, an operator identifier for an operator of the corresponding transaction terminal for the corresponding transaction, average voided item price for any voided items in the corresponding transaction, a total number of items having a quantity greater than 1 in the corresponding transaction, transaction duration for the corresponding transaction, and item price variance for the corresponding items recorded as a variance between a catalogue price of a given item in the corresponding transaction and a recorded price for the given item during the corresponding transaction, wherein training further includes flagging each transaction with an indication as to whether the corresponding transaction was or was not associated with a sweet hearting theft, wherein training further includes training the machine-learning algorithm to use the features as input and produce a sweet hearing prediction value as a value between 0 and 1 where 0 indicated there is no sweet hearting theft and 1 is sweet hearting theft;
producing a trained machine-learning algorithm from the training;
providing the trained machine-learning algorithm with given features derived from a given-set of basket data for a given transaction;
receiving from the trained machine-learning algorithm a given sweet hearting prediction value indicating whether a cashier associated with the given transaction is engaged in the sweet hearting theft; and
integrating the given sweet hearting value into a transaction workflow that processes the given transaction, the transaction workflow performs exception processing when the given sweet hearting value is greater than a threshold value.

2. The method of claim 1 further comprising, retraining the trained machine-learning algorithm with an additional indication as to whether the given transaction was associated with actual theft by the cashier or no theft by the cashier.

3. The method of claim 1 further comprising, linking a flagged transaction that was flagged for the given transaction as being associated the sweet hearting theft to corresponding video associated with the given transaction, wherein the video was captured for the transaction.

4. The method of claim 1 further comprising, interrupting, by the exception processing, the given transaction and preventing the given transaction from concluding until an override is received after an audit of the given transaction.

5. The method of claim 1 further comprising, generating a report associated with the cashier that includes the given transaction and flagged transactions for the cashier when a total number of flagged transactions exceeds a configured amount within a given period of time.

* * * * *